US006486899B1

(12) United States Patent
Bush, Jr.

(10) Patent No.: US 6,486,899 B1
(45) Date of Patent: Nov. 26, 2002

(54) SYSTEM AND METHOD FOR DISPLAYING LOGISTICS INFORMATION ASSOCIATED WITH A SUPPLY CHAIN

(75) Inventor: John Robbins Bush, Jr., South Lake, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/397,473

(22) Filed: Sep. 17, 1999

Related U.S. Application Data (60) Provisional application No. 60/100,977, filed on Sep. 18, 1998.

(51) Int. Cl.[7] .................................................. G06F 3/00
(52) U.S. Cl. ........................ 345/855; 345/853; 345/835; 345/839
(58) Field of Search ................................. 345/764, 835, 345/839, 853, 965, 855, 440, 440.2; 705/7, 8, 22, 28, 29

(56) References Cited

U.S. PATENT DOCUMENTS

| | | | | |
|---|---|---|---|---|
| 5,136,690 A | | 8/1992 | Becker et al. | 395/161 |
| 5,237,497 A | * | 8/1993 | Sitarski | 364/402 |
| 5,369,570 A | * | 11/1994 | Parad | 364/401 |
| 5,596,703 A | | 1/1997 | Erick et al. | 395/326 |
| 6,141,007 A | * | 10/2000 | Lebling et al. | 345/792 |
| 6,286,017 B1 | * | 9/2001 | Egilsson | 707/503 |

FOREIGN PATENT DOCUMENTS

| | | | | |
|---|---|---|---|---|
| EP | 0770967 A2 | * | 5/1997 | G06F/17/60 |
| GB | 2302427 A | * | 1/1997 | G06F/17/60 |
| WO | WO 92/08184 | * | 5/1992 | G06F/3/14 |

OTHER PUBLICATIONS

International Preliminary Examining Authority Written Opinion, Oct. 18, 2000.

\* cited by examiner

*Primary Examiner*—John Cabeca
*Assistant Examiner*—Kieu D. Vu
(74) *Attorney, Agent, or Firm*—Baker & Botts L.L.P.

(57) ABSTRACT

A system for displaying logistics information using one or more computers includes a presentation interface. The presentation interface generates a first panel displaying a plurality of icons and a plurality of links. The icons represent entities in a supply chain. Each link couples two of the icons and represents one or more distribution resources for moving one or more items between entities represented by the two icons. Each link indicates a distribution time associated with moving the items between the entities represented by the two icons. Each link may have a length proportional to the distribution time associated with moving the items between the entities represented by the two icons, or may include a time icon indicating the distribution time associated with moving the items between the entities represented by the two icons.

42 Claims, 7 Drawing Sheets

SYSTEM AND METHOD FOR DISPLAYING LOGISTICS INFORMATION ASSOCIATED WITH A SUPPLY CHAIN

CROSS REFERENCE TO RELATED APPLICATIONS

This application claims the benefit of U.S. Provisional Application No. 60/100,977 entitled "Supply Chain Management Tool With Logistics Management," filed Sep. 18, 1998 pending.

This application is related to U.S. Application No. 09/374,461 entitled "System and Method for Visually Representing a Supply Chain," filed Aug. 13, 1999, and U.S. application No. 09/397,423 entitled "System and Method for Displaying Planning Information Associated with a Supply Chain," filed Sep. 17, 1999.

TECHNICAL FIELD OF THE INVENTION

This invention relates generally to the field of supply chain planning and, more particularly, to a system and method for displaying logistics information associated with a supply chain.

BACKGROUND OF THE INVENTION

A supply chain is a process or series of processes for providing one or more products to customers. For example, a supply chain may include procurement of raw material or component parts, manufacturing, distribution, warehousing, and product sales. A supply chain may exist entirely within a single enterprise or may span a number of enterprises. Business enterprises generally use computer-implemented management systems to model supply chains and to generate plans for providing products to customers. Typically, management systems address planning decisions as constrained optimization problems.

For example, in a manufacturing environment, a management system might schedule a sequence of tasks for a piece of manufacturing equipment. The management system might specify start times for each task according to one or more optimization criteria, such as minimizing inventory, maximizing profit, or maximizing resource utilization. The management system might also consider various constraints, such as the capabilities of the equipment or deadlines by which products must be delivered to customers. Unfortunately, as supply chains continue to become more complex, existing management systems are increasingly inadequate for displaying logistics information in a comprehensible manner that allows users to efficiently and effectively manage a supply chain.

SUMMARY OF THE INVENTION

In accordance with the present invention, a system and method for displaying logistics information associated with a supply chain is provided that reduces or eliminates disadvantages and problems associated with previous supply chain management systems and methods.

According to one embodiment of the present invention, a system for displaying logistics information using one or more computers includes a presentation interface. The presentation interface generates a first panel displaying a plurality of icons and a plurality of links. The icons represent entities in a supply chain. Each link couples two of the icons and represents one or more distribution resources for moving one or more items between entities represented by the two icons. Each link indicates a distribution time associated with moving the items between the entities represented by the two icons. Each link may have a length proportional to the distribution time associated with moving the items between the entities represented by the two icons, or may include a time icon indicating the distribution time associated with moving the items between the entities represented by the two icons.

The system and method of the present invention provide a number of important technical advantages. The present invention describes a system and method for visually displaying logistics information to a user. Using the displayed logistics information, a supply chain planner can evaluate the performance of an existing or simulated supply chain. By viewing logistics information for the supply chain over several time periods, a user can discover logistical problems that otherwise may have remained undetected. In addition, by examining the dynamic behavior of a supply chain according to the displayed logistics information, a user can more easily improve the movement of raw materials, component parts, equipment, products, or any other items in the supply chain. Additional technical advantages will be readily apparent to those skilled in the art.

BRIEF DESCRIPTION OF THE DRAWINGS

To provide a more complete understanding of the present invention, and further features and advantages thereof, reference is now made to the following description taken in conjunction with the accompanying drawings, in which.

DETAILED DESCRIPTION OF THE INVENTION

Figure 1:
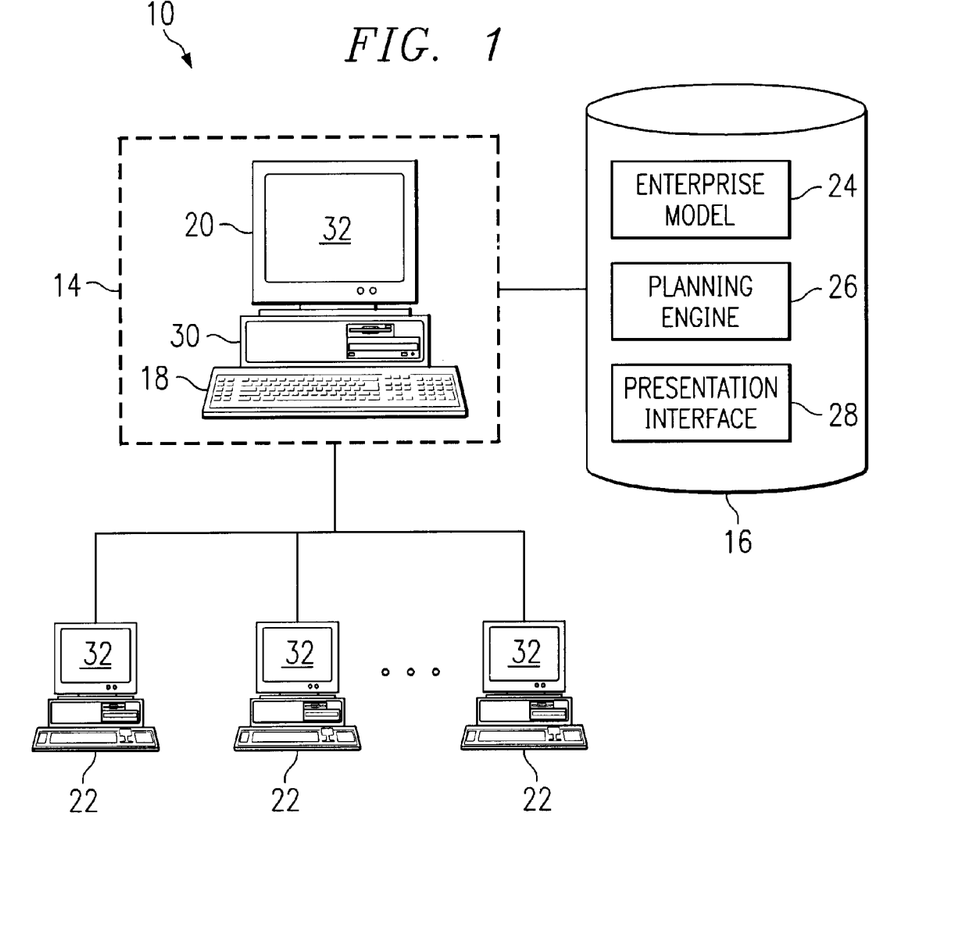
FIG. 1 illustrates an exemplary system for managing supply chain logistics according to the present invention.

FIG. 1 illustrates an exemplary system 10 for managing a supply chain. System 10 includes a computer 14 having an associated a memory 16, an input device 18, and an output device 20. As described in further detail below, system 10 generates a visual display 32 that provides logistics information describing the movement, location, or movement and location of items within the supply chain. System 10 may be part of a larger supply chain management system that provides one or more other supply chain solutions, such as demand planning, manufacturing planning, transportation or other distribution planning, and order promising and fulfillment.

Memory 16 contains an enterprise model 24, a planning engine 26, and a presentation interface 28. Enterprise model 24, planning engine 26, and presentation interface 28 represent software components that may each be responsible for a separate set of well-defined tasks. In a particular embodiment, the RHYTHM modeling and planning tools available from 12 TECHNOLOGIES, INC. may be adapted to implement enterprise model 24, planning engine 26, and presentation interface 28. Although memory 16 is illustrated as external to computer 14 in FIG. 1, memory 16 may include one or more storage locations internal or external to computer 14 according to particular needs. Memory 16 may include volatile memory, non-volatile memory, or both.

Enterprise model 24 represents a supply chain. To provide products to customers, an enterprise must use resources to perform various activities. These resources may include raw materials, component parts, labor, manufacturing facilities and equipment, distribution channels, transportation resources, warehouses, sales support, or any other resources that affect the enterprise's ability to provide products to customers. Enterprise model 24 represents the tasks and resources associated with each product in a supply chain, preferably at multiple levels of detail or aggregation.

Planning engine 26 generates logistics information relating to the movement, location, or movement and location of raw materials, component parts, equipment, products, or any other items that flow from one supply chain entity to another in a supply chain. The logistics information may relate to the past performance of a supply chain, a simulated future performance of a supply chain based on a proposed logistical plan, or any suitable combination of the two. The logistics information may describe a supply chain at various levels of detail and may relate to long-term, short-term, or any other suitable time horizon. For example, the logistics information may describe the aggregate movement of products over a span of several years or may specify daily activities relating to carrier selection, shipment costs, shipping dates and times, and arrival dates and times. Planning engine 26 may provide various hierarchical or other levels of logistics information. At a tactical level, engine 26 may develop plans that synchronize supply with demand. At an operational level, engine 26 may coordinate load consolidation, carrier selection, routing, and scheduling. At an execution level, engine 26 may support real-time management of dispatching and load tracking. The present invention contemplates engine 26 performing any suitable supply chain planning tasks according to particular needs.

In one embodiment, when developing a logistical plan, planning engine 26 attempts to maximize or minimize one or more optimization criteria while satisfying specified constraints. The optimization criteria may include maximizing resource utilization, minimizing inventory, maximizing profit, maximizing profit margins, or any other suitable criteria according to particular needs. The constraints may include resource requirements, resource availability, material or capacity requirements, material or capacity availability, process run rates and yields, demand, contractual demand fulfillment requirements, order commitments, initial on-hand inventories, maximum and minimum inventory amounts, customer priority, carrier preferences, transit times, truck or other vehicle capacity or availability, truck or other vehicle weight, alternate transportation modes, or any other factors that affect the movement of items in a supply chain. By changing one or more constraints or optimization criteria, a user may simulate and evaluate proposed logistical plans using engine 26.

Presentation interface 28 provides a user interface for inputting data affecting model 24, for scenario analysis of model 24, and for viewing logistics information generated by engine 26. Based on the logistics information generated by engine 26, presentation interface 28 generates visual display 32, which is described in further detail below with reference to FIGS. 2–4.

Enterprise model 24, planning engine 26, and presentation interface 28 operate on at least one computer 14 that includes at least one processor 30. Computer 14 receives information from a user using input device 18, which may include a keyboard, mouse, touch-screen, microphone, or any other device that receives information from a user. Computer 14 presents visual display 32 to a user using output device 20, which may include a computer monitor, a projector, a printer, or any other suitable device with a display screen or other visual output capability. In a particular embodiment, computer 14 is a network server, and users interact with computer 14 using one or more client computers 22. In such an embodiment, client computers 22 may provide logistics information relevant to various personnel at geographically distributed locations using visual display 32. Although a particular software implementation is described with reference to FIG. 1, system 10 contemplates any suitable combination of hardware, software, or both hardware and software that generates visual displays 32 described more fully below with reference to FIGS. 2–4.

Figure 2A:
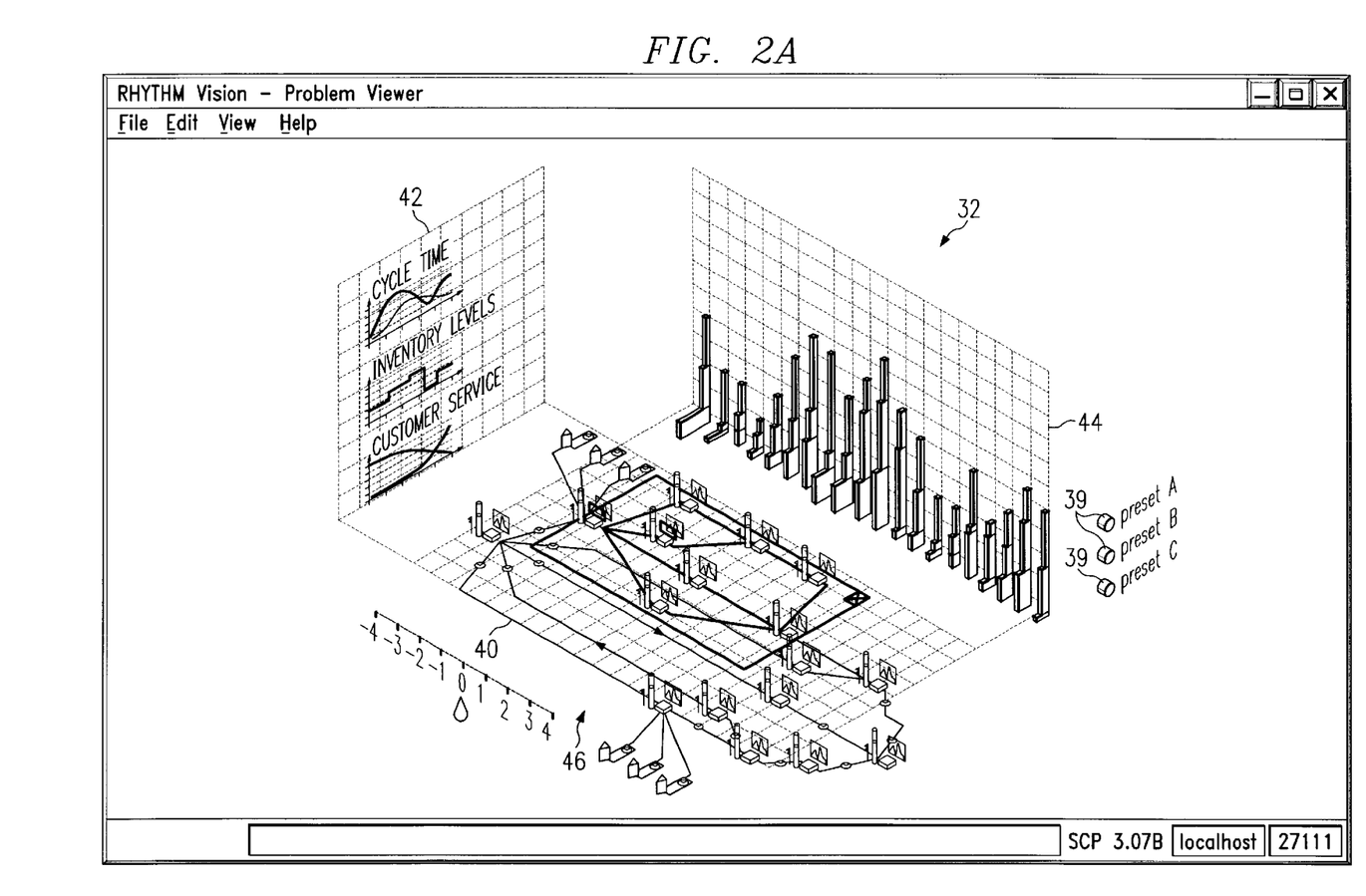
FIGS. 2A, 2B, 2C, and 2D illustrate an exemplary visual display of a supply chain in temporal mode according to the present invention.

FIG. 2A illustrates an exemplary visual display 32 of a supply chain in temporal mode. Presentation interface 28 generates visual display 32 based on the logistics information generated by planning engine 26. As described above, logistics information relates to the movement, location, or movement and location of raw materials, component parts, equipment, products, or any other items that may flow from one supply chain entity to another in a supply chain. Buttons 39 permit a user to select different plans generated by engine 26. In one embodiment, visual display 32 is a multi-dimensional report that provides, in a single window, information that would otherwise require separate windows. Visual display 32 includes a bottom panel 40, a left panel 42, and a right panel 44. As described in further detail below, presentation interface 28 coordinates the display of logistics information for a supply chain among bottom panel 40, left panel 42, and right panel 44.

Figure 2B:
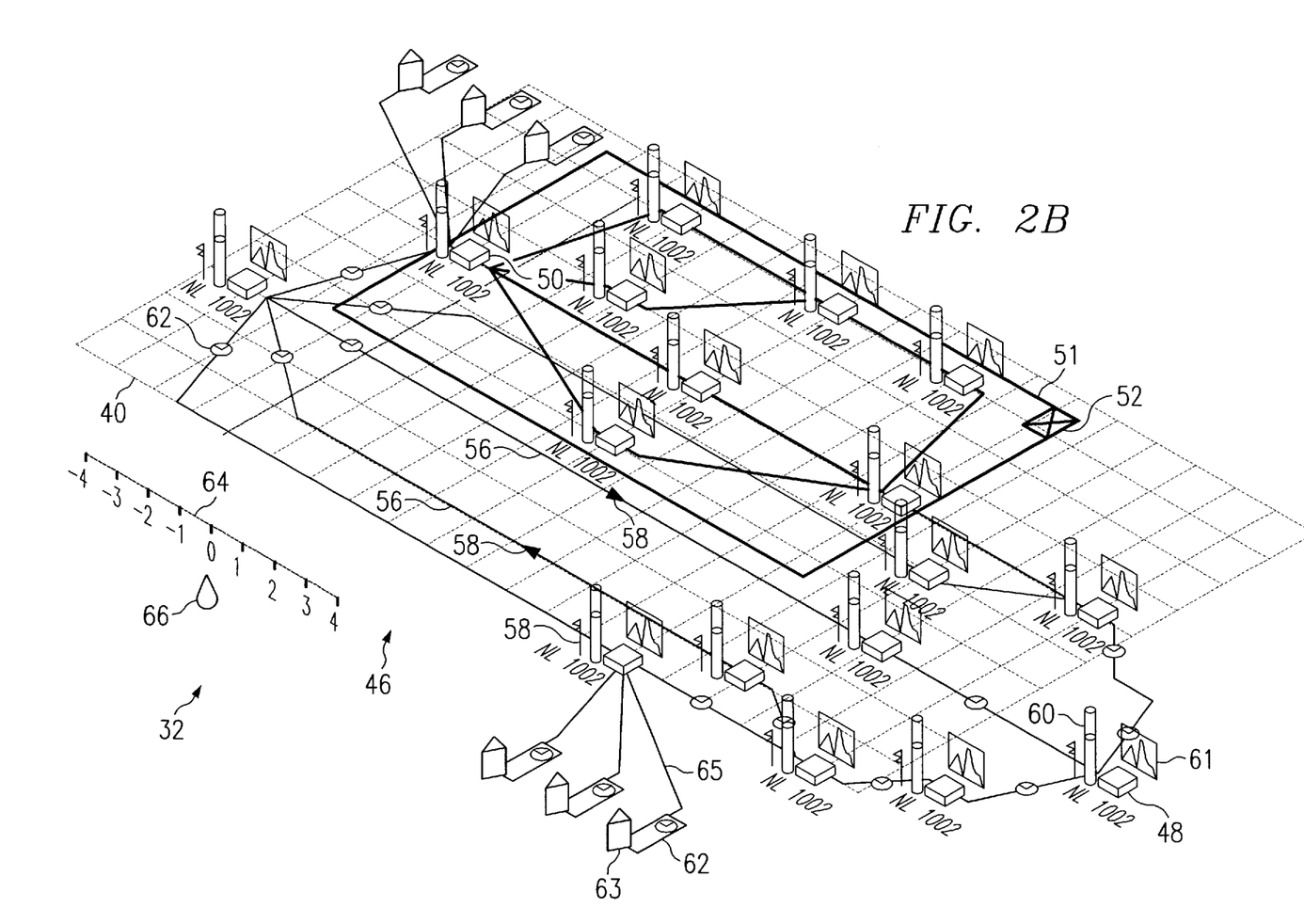

FIG. 2B illustrates an exemplary bottom panel 40 of visual display 32. Bottom panel 40 displays a physical representation 46 of a supply chain. Icons 48 represent suppliers, factories, distribution centers, warehouses, retail stores, or any other entities affecting the movement of raw materials, component parts, equipment, products, or any other items in the supply chain. Links 56 couple together two or more icons 48 to represent distribution resources in the supply chain. The distribution resources may include transportation resources, shipping resources, or any other resources that affect the movement of raw materials, component parts, equipment, products, or any other items between entities in the supply chain. In a particular embodiment, arrows or other directional indicators 58 specify the direction of movement of items between supply chain entities. Icons 48 and links 56 may generally be referred to as elements of the supply chain illustrated in bottom panel 40.

A particular icon 50 may represent several entities and, thus, depict a "sub-chain" within the supply chain. In response to a user selecting icon 50, presentation interface 28 may expand icon 50 into several icons 48 to display the sub-chain in greater detail. In the illustrated embodiment, presentation interface 28 generates a shaded window 51 to display icons 48 in the sub-chain, and in response to a user clicking an "X" box 52, presentation interface 28 collapses window 51 and represents the sub-chain using icon 50.

Bottom panel 40 may display the supply chain in a temporal mode, a geographical mode, or a logical mode. In FIG. 2B, bottom panel 40 displays the supply chain in temporal mode. In temporal mode, presentation interface 28 organizes icons 48 according to average or other suitable distribution times between the supply chain entities represented by icons 48. Specifically, the length of each link 56 is proportional to an average or other suitable distribution time between two supply chain entities. The geographical and logical modes are described below with reference to FIGS. 3 and 4, respectively. In addition, geographical and logical modes are discussed in U.S. Application No. 09/374, 461 entitled "System and Method for Visually Representing a Supply Chain," which is incorporated in this application by reference.

Using notification flags 58, presentation interface 28 may display logistics information relating to entities or distribution resources in the supply chain. In the illustrated embodiment, notification flags 58 are adjacent icons 48 and have one or more display characteristics that communicate logistics information corresponding to the entities represented by adjacent icon 48. In alternative embodiments, notification flags 58 may appear adjacent links 56 and have one or more display characteristics that communicate logistics information corresponding to distribution resources represented by links 56. The display characteristics of flags 58 may include sizes, shapes, heights, colors, patterns, or any other suitable visual characteristics. To communicate different types of logistics information, presentation interface 28 may use two or more flags 58 with each icon 48 or link 56, or may simultaneously use two or more display characteristics for each flag 58 adjacent icons 48 or links 56. For example only and not by way of limitation, the color of flags 58 may indicate a type of notice, and the size of flag 58 may indicate the importance of the notice.

In addition, presentation interface 28 may manipulate one or more display characteristics of bars 60 to communicate logistics information relating to the entities or distribution resources in a supply chain. In the illustrated embodiment, bars 60 are adjacent icons 48 and have one or more display characteristics that communicate logistics information corresponding to the supply chain entities represented by adjacent icon 48. In alternative embodiments, bars 60 may appear adjacent links 56 and have one or more display characteristics that communicate logistics information corresponding to distribution resources represented by links 56. As with flags 58, the display characteristics of bars 60 may include sizes, shapes, heights, colors, patterns, or any other suitable visual characteristics. To communicate different types of data, presentation interface 28 may associate two or more bars 60 with each icon 48 or link 56, or may simultaneously use two or more display characteristics for each bar 60 adjacent icons 48 or links 56. For example and not by way of limitation, each icon 48 may be associated with two bars 60: one with a height representing total capacity and the other having a height representing current inventory.

Presentation interface 28 may also display logistics information relating to entities or distribution resources using graphs 61. In the illustrated embodiment, graphs 61 are adjacent icons 48 and include logistics information corresponding to the entities represented by adjacent icons 48. In alternative embodiments, graphs 61 may appear adjacent links 56 and include logistics information corresponding to distribution resources represented by adjacent links 56. Presentation interface 28 may allow a user to zoom-in on bottom panel 40 to more easily view graphs 61, or in response to a user selecting one of graphs 61, presentation interface 28 may reproduce selected graph 61 in a pop-up window (not shown).

In one embodiment, links 56 include time icons 62 indicating distribution times between supply chain entities. Time icons 62 may represent distribution times in terms of minutes, hours, days, weeks, months, or any other suitable unit of time. In a particular embodiment, presentation interface 28 uses different styles of time icons 62 to represent different units of time. The style of icons 62 may indicate a type of units, and some display characteristic of each icon 62 may indicate a quantity of the units. For example only and not by way of limitation, hour-glass shaped icons 62 may communicate distribution times in terms of minutes, where the amounts of "sand" in the hour glasses indicates specific numbers of minutes. Clock-shaped icons 62 may communicate distribution times in units of hours, where each shaded quarter on the face of the clock represents six hours of distribution time. Calendar icons 62 may shade grid boxes representing days to indicate a number of days it takes to distribute items between two supply chain entities. Stacks of calendar icons 62 or icons 62 depicting an earth rotating around a sun may communicate distribution times in units of months, and birthday cake icons 62, including candles representing years, may communicate distribution times in terms of years. In response to a user selecting one of time icons 62, presentation interface 28 may generate a pop-up window (not shown) displaying one or more specific time values.

Presentation interface 28 may also use time icons 62 to indicate processing times associated with entities represented by icons 48. In the illustrated embodiment, processing icons 63 represent processing steps associated with entities in the supply chain. In response to a user selecting one of icons 48, presentation interface 28 displays one or more processing icons 63 associated with one or more entities represented by selected icon 48. As shown, time icons 62 adjacent processing icons 63 may indicate processing times associated with the processing steps represented by processing icons 63. In an alternative embodiment, the lengths of links 65 coupling entity icons 48 and processing icons 63 are proportional to the processing times associated with processing icons 63.

Presentation interface 28 allows a user to "drill down" to retrieve more detailed information relating to the supply entities or distribution resources in the supply chain. In response to a user selecting one of icons 48, presentation interface 28 may generate a pop-up window (not shown) providing numeric or text information relating to one or more entities represented by selected icon 48. For example, if selected icon 48 represents a factory, the pop-up window may provide numeric information indicating capacity or inventory levels at the factory. Similarly, in response to a user selecting one of links 56, presentation interface 28 may generate a pop-up window (not shown) providing numeric or text information describing distribution resources represented by selected link 56. In this manner, a user may "drill-down" at any icon 48 or link 56 to explore in greater detail "sub-chain" elements in the supply chain. Using windows-type borders, the user can click on appropriate portions of the border to return to the previous level of detail.

Bottom panel 40 may use different planes to display different aspects of a supply chain. Specifically, bottom panel 40 may associate separate planes with different enterprises, products, distribution resources, or any other suitable elements of a supply chain. For example, in an automotive products supply chain, a top plane may include icons 48 representing FORD entities, a bottom plane may include icons 48 representing GENERAL MOTORS entities, and a middle plane may include icons 48 representing entities serving both FORD and GENERAL MOTORS. In such an embodiment, a user may easily compare the performance of the companies' supply chains.

Bottom panel 40 may include a timeline 64 that allows a user to request data for a specific time period. Timeline 64 is divided in a number of segments that represent chronological periods of time. The time periods may be hours, days, weeks, months, quarters, years, or any other suitable time period for the display of logistics information. By manipulating a pointer 66, a user may select one of the time periods and, in response, presentation interface 28 may display logistics information relating to the selected time period. This filtering of data by time period gives a user a powerful mechanism for visualizing the movement of raw materials, component parts, equipment, products, or any other items in a supply chain. For example, a user may notice that a production shortfall in one month was caused by an inventory shortage resulting from distribution problems during a previous month. By viewing the supply chain over several time periods, a user can discover logistics problems that otherwise may have remained undetected.

Bottom panel 40 may also animate a supply chain by displaying logistics information for a particular period of time and, after a brief amount of time, automatically displaying a next chronological time period. This animation allows a user to visualize changes in the supply chain over time. The time periods may be hours, days, weeks, months, quarter, years, or any other suitable time period. A user may control the speed of the animation by changing the amount of time between changes in the display. This animation provides a major advantage for understanding the movement of raw materials, component parts, equipment, products, or any other items in a supply chain. Using animation, a user can observe logistics problems surface and disappear over different parts of the supply chain. In addition, a user may rerun an animation numerous times to develop a better understanding of the dynamic operation of the supply chain and to evaluate particular supply chain plans and schedules.

Figure 2C:
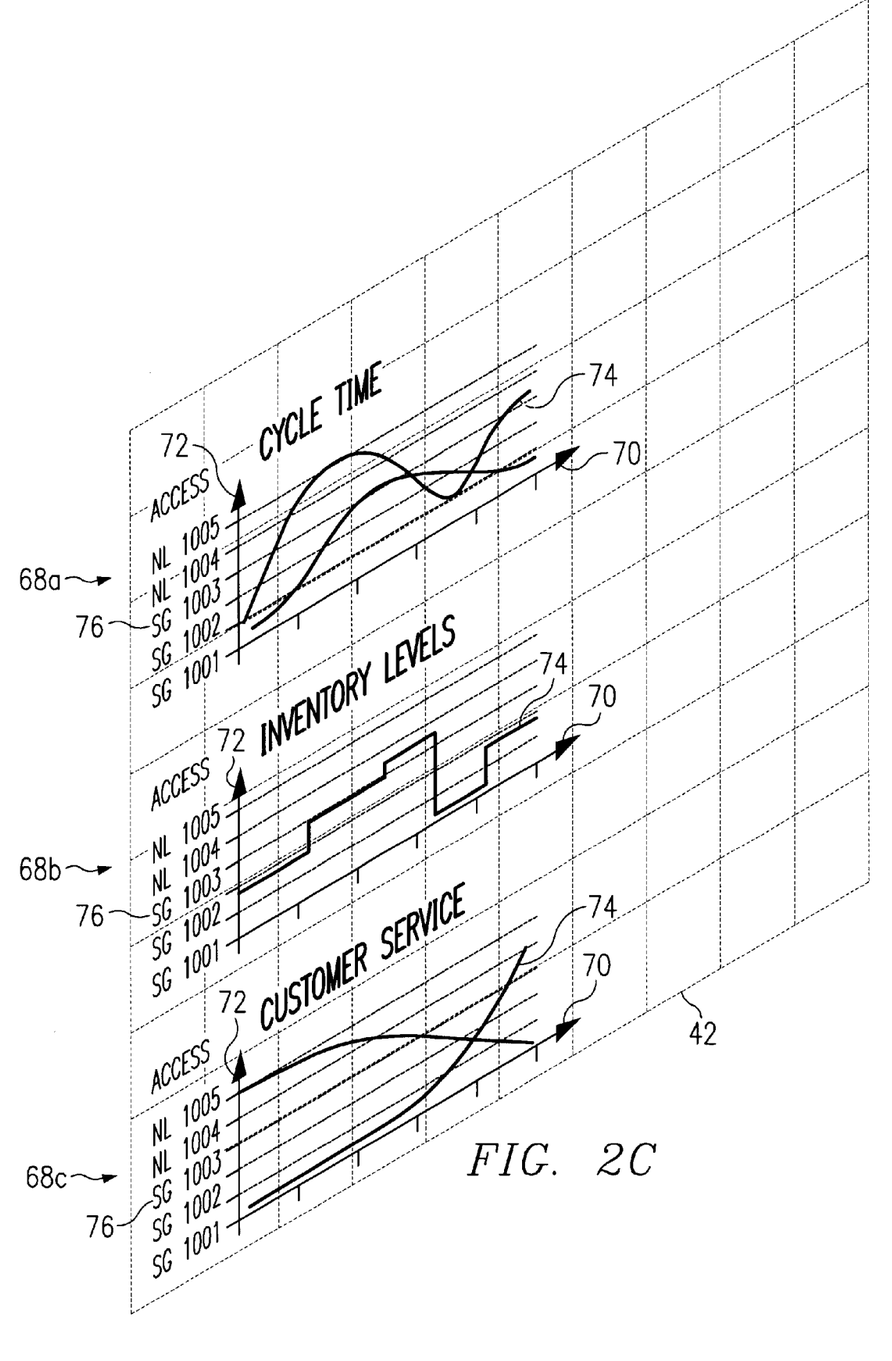

FIG. 2C illustrates an exemplary left panel 42 of visual display 32. Left panel 42 displays graphs 68a, 68b and 68c (collectively, graphs 68) plotting various performance parameters over time. Although left panel 42 includes three graphs 68 in FIG. 2C, left panel 42 may include any suitable number of graphs 68 according to particular needs. In each graph 68, an x-axis 70 is scaled in units of time, and a y-axis 72 is scaled according to a specified performance parameter. In the illustrated embodiment, graph 68a plots cycle time versus time, graph 68b plots inventory levels versus time, and graph 68c plots customer service versus time. Each x-axis 70 may be scaled by hours, days, weeks, months, quarters, years, or any other suitable unit of time. Left panel 42 may generate graphs 68 according to one or more performance parameters selected by a user. Performance parameters may include profit margins per unit, profit margins per hour, rates of production, average transit time, forecasted demand, cashflow, cycle times, throughput, inventory levels, customer service levels, percentage of on-time deliveries, number of deliveries, or any other parameters relating to the performance of the supply chain. In response to a user selecting a performance parameter, presentation interface 28 generates an appropriate graph 68 plotting the selected performance parameter versus time.

In each graph 68, presentation interface 28 plots one or more paths 74 relating to one or more selected elements in the supply chain. In response to a user selecting one or more links 56 in bottom panel 40, presentation interface 28 plots paths 74 associated with distribution resources represented by selected links 56. In response to a user selecting one or more icons 48 in bottom panel 40, presentation interface 28 plots paths 74 associated with supply chain entities represented by selected icons 48. For example, if a user selects five icons 48 in bottom panel 40, presentation interface 28 may plot five paths 74, each path associated with a separate selected supply chain entity. In a particular embodiment, one of paths 74 may be associated with a set of selected distribution resources or supply entities. For example, if a user selects three links 56, presentation interface 28 may plot one path 74 to indicate the combined performance of the three selected distribution resources. With this feature, a user may select the entire supply chain to examine the aggregate performance of the supply chain. Along y-axis 72 of graphs 68, presentation interface 28 provides identifiers 76 specifying the supply entities and distribution resources selected by the user.

Figure 2D:
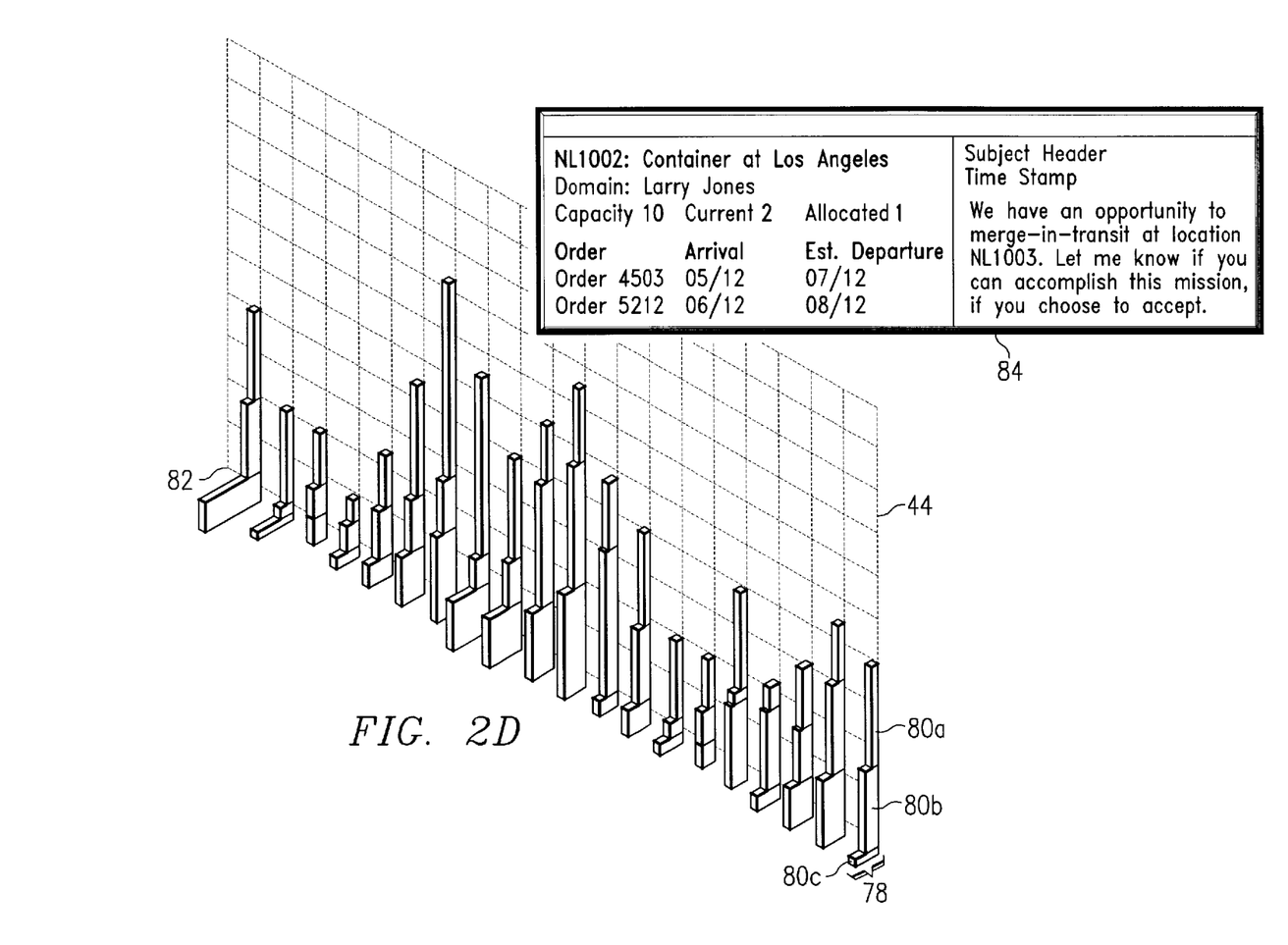

FIG. 2D illustrates an exemplary right panel 44 of visual display 32. Right panel 44 displays bar graphs corresponding to icons 48 in bottom panel 40. Using a toolbar, a pull-down menu, or other interface, a user selects one or more performance parameters. The performance parameters may include profit margins per unit, profit margins per hour, rates of production, average transit time, forecasted demand, cash flow, cycle times, throughput, inventory levels, customer service levels, percentage of on-time deliveries, number of deliveries, capacity information, downtime statistics, costs, or any other parameters relating to the performance of the supply chain. In response to a user selecting one or more performance parameters, presentation interface 28 displays at least one set 78 of one or more bars 80a, 80b, and 80c (collectively, bars 80) in right panel 44. Each set 78 corresponds to one of icons 48 in bottom panel 40 and includes bars 80 having heights according to the selected performance parameters of corresponding icon 48. In the particular embodiment illustrated in FIG. 2D, each set 78 includes three bars 80 displaying capacity information. Specifically, bars 80a, 80b and 80c show total capacity, planned capacity usage, and allocated capacity usage, respectively, for each supply chain entity in bottom panel 40. Total capacity represents the amount of capacity in use or available for future use, planned capacity usage is the portion of total capacity forecasted for use, and allocated capacity is the portion of total capacity actually in use. Those skilled in the art will appreciate that any suitable performance parameters may be represented using bars 80.

Presentation interface 28 positions each set 78 of one or more bars 80 in right panel 44 according to the location of associated icons 48 in bottom panel 40. More specifically, the intersection of bottom panel 40 and right panel 44 form an axis 82, and sets 78 of bars 80 are located on axis 82 according to the relative positions of corresponding icons 48. If two icons 48 are located at the same relative position on axis 82, their corresponding sets 78 of bars 80 may partially overlap. To overcome problems associated with crowded data, presentation interface 28 allows a user to cycle through the logistics information using various mechanisms. For example, in response to a user selecting one of icons 48, presentation interface 28 may move corresponding set 78 of bars 80 to the top of the display in right panel 44. In addition, in response to a user selecting one of sets 78, presentation interface 28 may generate a pop-up window 84 displaying numeric or text information relating to bars 80 of selected set 78. For example, in the embodiment illustrated in FIG. 2D, pop-up window 84 shows numeric values for total capacity, planned capacity usage, and allocated capacity usage. In addition, pop-up window 84 displays the customer orders making up the planned capacity usage. Because presentation interface 28 coordinates the positions of sets 78 on right panel 44 with the positions of icons 48 in bottom panel 40, if one of icons 48 is moved in bottom panel 40, its corresponding set 78 of bars 80 also moves in right panel 40.

Presentation interface 28 may generate several sets 78 of bars 80 to represent one or more performance parameters over different time periods. By "fanning out" several sets 78 of bars 80 for consecutive time periods, a user can more easily recognize trends related to the performance parameters. The time periods may be hours, days, weeks, months, quarters, or any other suitable time period for evaluating information relating to one or more selected performance parameters.

Although a particular embodiment of the invention and its advantages are described in detail with reference to FIGS. 2A, 2B, 2C, and 2D, the present invention contemplates various alterations, additions, and omissions to visual display 32. For example, a person skilled in the art may switch the positions of panels 40, 42 and 44 or alter the sizes or shapes of icons 48, connectors 56, flags 58, bars 60, or graphs 61 without departing from the spirit and scope of the present invention.

Figure 3:
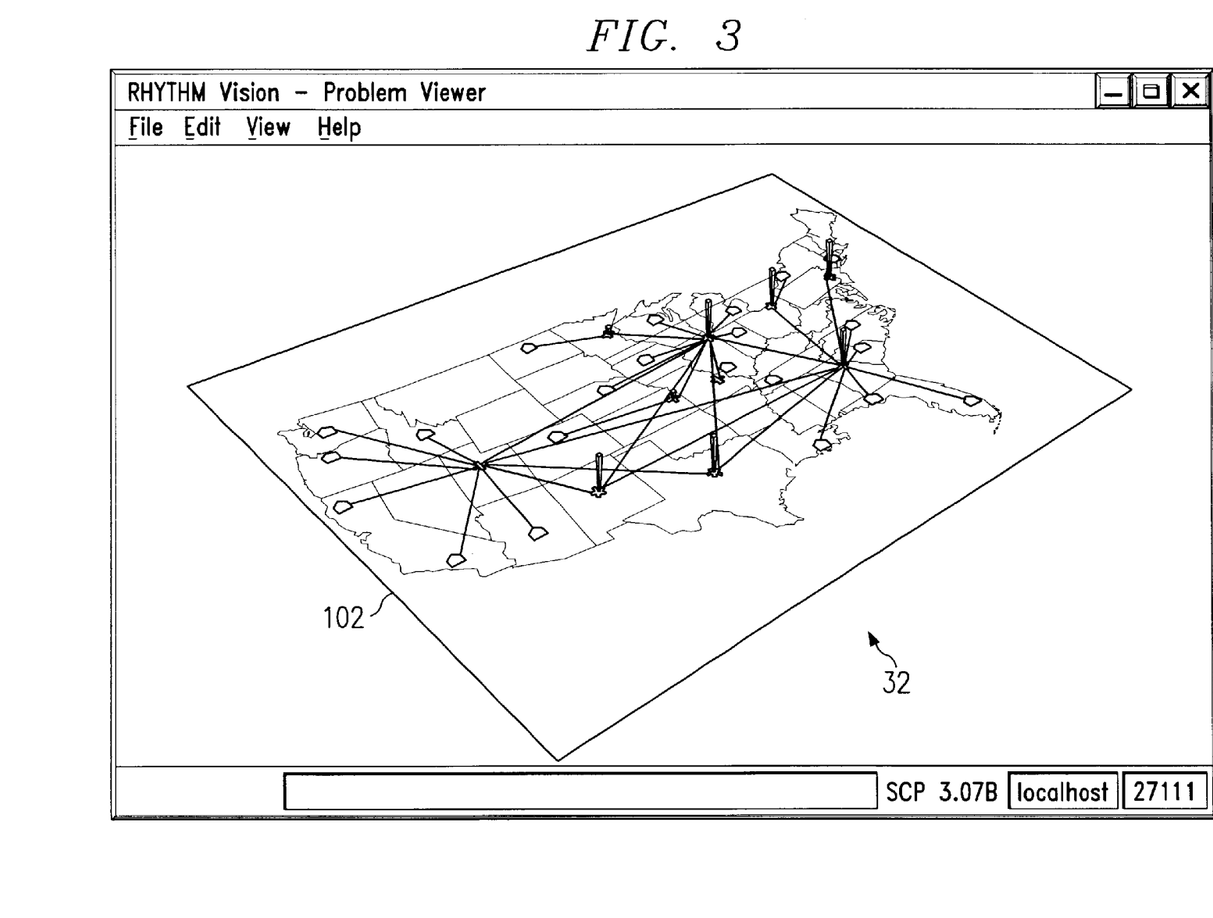
FIG. 3 illustrates an exemplary visual display of a supply chain in geographical mode according to the present invention.
Figure 4:
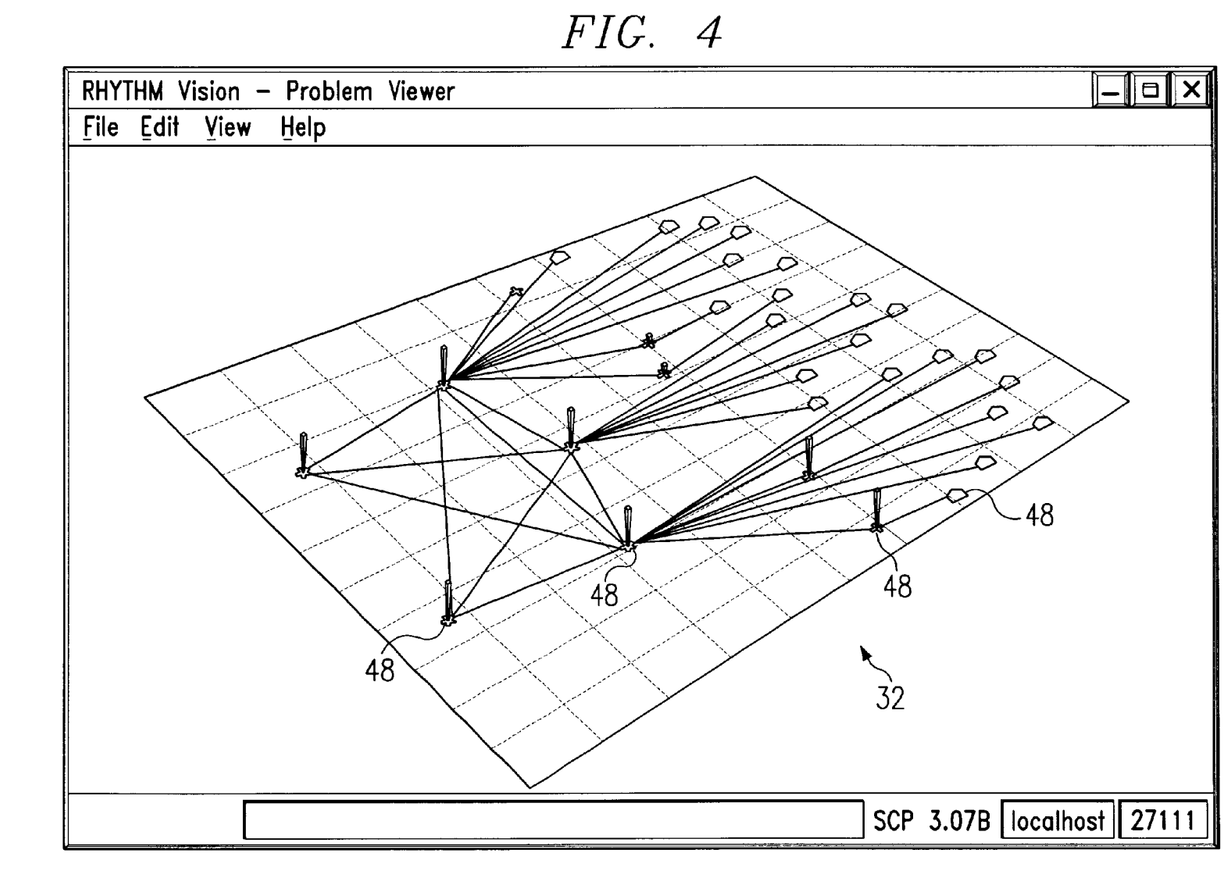
FIG. 4 illustrates an exemplary visual display of a supply chain in logical mode according to the present invention.

FIGS. 3 and 4 illustrate organizational alternatives to the temporal mode of FIGS. 2A and 2B. FIG. 3 illustrates an exemplary visual display 32 of a supply chain in geographical mode. In geographical mode, bottom panel 40 includes an input map 102 of an geographic area. Bottom panel 40 displays icons 48 on input map 102 according to the geographic locations of the supply chain entities represented by icons 48. Input map 102 may include cities, states, countries, or any other suitable geographic features. In the illustrated embodiment, input map 102 is the contiguous United States, although any suitable input map 102 may be used.

FIG. 4 illustrates an exemplary visual display 32 of a supply chain in logical mode. Bottom panel 40 displays icons 48 arranged according to the logical flow of raw materials, component parts, equipment, products, or any other items in the supply chain. For example, in the illustrated embodiment, icons 48 may represent, from left to right, suppliers, factories, distribution centers, and customers, respectively. The logical arrangement may be similar to the temporal arrangement of icons 48 in bottom panel 40 of FIGS. 2A and 2B.

Although temporal, geographical, and logical modes are described in detail, bottom panel 40 may display supply chain entities in a variety of ways without departing from the scope of the present invention. For example, in an alternative embodiment, bottom panel 40 may combine geographical and logical modes to produce a combined mode. In the combined mode, bottom panel 40 displays two or more input maps 102 of a geographic region, and each icon 48 appears on at least one of input maps 102 according to the flow of raw materials, component parts, equipment, products, or any other items in the supply chain. In a particular embodiment, bottom panel 40 stacks input maps 102 vertically on top of each other and places icons 48 representing different types of supply entities on each map 102. For example, factory icons 48 may appear on a top map 102, distribution center icons 48 may appear on a middle map 102, and customer icons 48 may appear on a bottom map 102. Links 56 between maps 102 represent the movement of items between icons 48. In such an embodiment, links 56 may change colors according to the orientation of maps 102 so as to interfere less with other graphical displays, such as flags 58, bars 60, and graphs 61. Using a combined mode, a user can better understand the logical and geographical flow of the supply chain. Similarly, in an alternative embodiment, bottom panel 40 may combine temporal and logical modes to produce a combined mode, where icons are arranged according to the logical flow of items in the supply chain and separated according to distribution times between the entities.

According to the present invention, visual display 32 may be manipulated in any of the ways used to manipulate standard three-dimensional graphics. For example, visual display 32 may be rotated along any of three axes, or a user may rearrange visual display 32 using input device 18 to reveal hidden or obscured data. Furthermore, icons 48, connectors 56, flags 58, bars 60, and graphs 61 may be displayed in two or three dimensions.

Although the present invention has been described with several embodiments, a person skilled in the art could make various alterations, modifications, and additions without departing from the spirit and scope of the present invention as defined in the appended claims.

What is claimed is:

1. A system operating on one or more computers for displaying supply chain logistics information, the system comprising a presentation interface operable to generate a first panel displaying:

a plurality of icons each representing a supply chain entity;

a plurality of links each coupling two of the icons and representing one or more distribution resources for moving one or more items between the supply chain entities represented by the two icons, each link indicating a distribution time associated with moving the items between the supply chain entities represented by the two icons, the distribution time associated with moving the items between the supply chain entities represented by the two icons being dependent, at least in part, on information other than a distance between the supply chain entities; and each link having a length proportional to the distribution time associated with moving the items between the supply chain entities represented by the two icons.

2. The system of claim 1, wherein each link includes a time icon indicating the distribution time associated with moving the items between the supply chain entities represented by the two icons.

3. The system of claim 1, wherein the presentation interface is further operable to display the icons on an input map according to the geographic positions of the supply chain entities, the presentation interface being operable in response to user input to selectively display the icons either according to the distribution times associated with moving the items between the corresponding supply chain entities or according to the geographic positions of the corresponding supply chain entities.

4. The system of claim 1, wherein the presentation interface is further operable to display the icons according to a logical flow of items among the supply chain entities, the presentation interface being operable in response to user input to selectively display the icons either according to the distribution times associated with moving the items between the corresponding supply chain entities or according to the logical flow of items among the corresponding supply chain entities.

5. The system of claim 1, wherein the first panel displays a notification flag having a display characteristic that communicates supply chain logistics information corresponding to an adjacent element in the supply chain, the element being one of:

an icon; and a link.

6. The system of claim 1, wherein the first panel displays a bar having a display characteristic that communicates supply chain logistics information corresponding to an adjacent element in the supply chain, the element being one of:

an icon; and a link.

7. The system of claim 1, wherein the first panel displays a graph including supply chain logistics information corresponding to an adjacent element in the supply chain, the element being one of:
- an icon; and
- a link.

8. The system of claim 1, wherein the first panel displays a time icon indicating a processing time associated with a supply chain entity represented by an adjacent icon.

9. The system of claim 1, wherein an icon in the first panel represents a sub-chain in the supply chain and, in response to a user selecting the icon, the first panel displays two or more icons to represent the sub-chain.

10. The system of claim 1, wherein the presentation interface is further operable to generate a second panel displaying one or more graphs, each graph illustrating a selected performance parameter over time according to supply chain logistics information associated with a corresponding element in the supply chain, the element being one of;
- an icon; and
- a link.

11. The system of claim 10, wherein the second panel displays a graph illustrating supply chain logistics information associated with:
- a supply chain entity in response to a user selecting a corresponding icon in the first panel; and
- a distribution resource in response to a user selecting a corresponding link in the first panel.

12. The system of claim 1, wherein the presentation interface is further operable to generate a second panel displaying one or more sets of bar graphs, each set associated with a supply chain entity and including one or more bars each illustrating a specified performance parameter according to supply chain logistics information for the supply chain entity.

13. The system of claim 12, wherein the second panel displays each set of bar graphs along an axis according to a relative position of a corresponding icon in the first panel.

14. The system of claim 1, wherein the supply chain logistics information is monitored substantially continuously, when generated the first panel displaying a substantially real-time view of the distribution times associated with moving the items between the supply chain entities to facilitate logistics planning and execution.

15. A method operating on one or more computers for displaying supply chain logistics information, the method comprising:
- displaying, in a first panel, a plurality of icons each representing a supply chain entity;
- displaying, in the first panel, a plurality of links each coupling two of the icons and representing one or more distribution resources for moving one or more items between the supply chain entities represented by the two icons, each link indicating a distribution time associated with moving the items between the supply chain entities represented by the two icons, the distribution time associated with moving the items between the supply chain entities represented by the two icons being dependent, at least in part, on information other than a distance between the supply chain entities; and
- each link having a length proportional to the distribution time associated with moving the items between the supply chain entities represented by the two icons.

16. The method of claim 15, wherein each link includes a time icon indicating the distribution time associated with moving the items between the supply chain entities represented by the two icons.

17. The method of claim 15, further comprising:
- displaying the icons on an input map according to the geographic positions of the supply chain entities; and
- in response to user input, selectively displaying the icons either according to the distribution times associated with moving the items between the corresponding supply chain entities or according to the geographic positions of the corresponding supply chain entities.

18. The method of claim 15, further comprising:
- displaying the icons according to a logical flow of items among the supply chain entities; and
- in response to user input, selectively displaying the icons either according to the distribution times associated with moving the items between the corresponding supply chain entities or according to the logical flow of items among the corresponding supply chain entities.

19. The method of claim 15, further comprising displaying a notification flag having a display characteristic that communicates supply chain logistics information corresponding to an adjacent element in the supply chain, the element being one of:
- an icon; and
- a link.

20. The method of claim 15, further comprising displaying a bar having a display characteristic that communicates supply chain logistics information corresponding to an adjacent element in the supply chain, the element being one of:
- an icon; and
- a link.

21. The method of claim 15, further comprising displaying a graph including supply chain logistics information corresponding to an adjacent element in the supply chain, the element being one of:
- an icon; and
- a link.

22. The method of claim 15, further comprising displaying a time icon indicating a processing time associated with a supply chain entity represented by an adjacent icon.

23. The method of claim 15, further comprising:
- displaying one icon to represent a sub-chain in the supply chain; and
- displaying two or more icons to represent the sub-chain in response to a user selecting the one icon.

24. The method of claim 15, further comprising displaying one or more graphs in a second panel, each graph illustrating a selected performance parameter over time according to supply chain logistics information associated with a corresponding element in the supply chain, the element being one of:
- an icon; and
- a link.

25. The method of claim 24, further comprising displaying a graph in the second panel illustrating supply chain logistics information associated with:
- a supply chain entity in response to a user selecting a corresponding icon in the first panel;
- a distribution resource in response to a user selecting a corresponding link in the first panel.

26. The method of claim 15, further comprising displaying one or more sets of bar graphs in a second panel, each set associated with a supply chain entity and including one or more bars each illustrating a specified performance parameter according to supply chain logistics information for the supply chain entity.

27. The method of claim 26, further comprising displaying each set of bar graphs along an axis according to a relative position of a corresponding icon in the first panel.

28. The method of claim 15, further comprising monitoring the supply chain information substantially continuously, when generated the first panel displaying a substantially real-time view of the distribution times associated with moving the items between the supply chain entities to facilitate logistics planning and execution.

29. Software for displaying supply chain logistics information, the software being embodied in computer-readable media and when executed operable to:
 display, in a first panel, a plurality of icons each representing a supply chain entity;
 display, in the first panel, a plurality of links each coupling two of the icons and representing one or more distribution resources for moving one or more items between the supply chain entities represented by the two icons, each link indicating a distribution time associated with moving the items between the supply chain entities represented by the two icons, the distribution time associated with moving the items between the supply chain entities represented by the two icons being dependent, at least in part, on information other than a distance between the supply chain entities; and
 each link having a length proportional to the distribution time associated with moving the items between the supply chain entities represented by the two icons.

30. The software of claim 29, wherein each link includes a time icon indicating the distribution time associated with moving the items between the supply chain entities represented by the two icons.

31. The software of claim 29, further operable to:
 display the icons on an input map according to the geographic positions of the supply chain entities; and
 in response to user input, selectively display the icons either according to the distribution times associated with moving the items between the corresponding supply chain entities or according to the geographic positions of the corresponding supply chain entities.

32. The software of claim 29, further operable to:
 display the icons according to a logical flow of items among the supply chain entities; and
 in response to user input, selectively display the icons either according to the distribution times associated with moving the items between the corresponding supply chain entities or according to the logical flow of items among the corresponding supply chain entities.

33. The software of claim 29, further operable to display a notification flag having a display characteristic that communicates supply chain logistics information corresponding to an adjacent element in the supply chain, the element being one of:
 an icon; and
 a link.

34. The software of claim 29, further operable display a bar having a display characteristic that communicates supply chain logistics information corresponding to an adjacent element in the supply chain, the element being one of:
 an icon; and
 a link.

35. The software of claim 29, further operable to display a graph including supply chain logistics information corresponding to an adjacent element in the supply chain, the element being one of:
 an icon; and
 a link.

36. The software of claim 29, further operable to display a time icon indicating a processing time associated with a supply chain entity represented by an adjacent icon.

37. The software of claim 29, further operable to:
 display one icon to represent a sub-chain in the supply chain; and
 display two or more icons to represent the sub-chain in response to a user selecting the one icon.

38. The software of claim 29, further operable to display one or more graphs in a second panel, each graph illustrating a selected performance parameter over time according to supply chain logistics information associated with a corresponding element in the supply chain, the element being one of:
 an icon; and
 a link.

39. The software of claim 38, further operable to display a graph in the second panel illustrating supply chain logistics information associated with:
 a supply chain entity in response to a user selecting a corresponding icon in the first panel;
 a distribution resource in response to a user selecting a corresponding link in the first panel.

40. The software of claim 29, further operable to display one or more sets of bar graphs in a second panel, each set associated with a supply chain entity and including one or more bars each illustrating a specified performance parameter according to supply chain logistics information for the supply chain entity.

41. The software of claim 40, further operable to display each set of bar graphs along an axis according to a relative position of a corresponding icon in the first panel.

42. The software of claim 29, further operable to monitor the supply chain information substantially continuously, when generated the first panel displaying a substantially real-time view of the distribution times associated with moving the items between the supply chain entities to facilitate logistics planning and execution.

\* \* \* \* \*